A. E. BAUM.
TRANSMISSION DEVICE.
APPLICATION FILED MAY 15, 1911.

1,011,905.

Patented Dec. 19, 1911.

2 SHEETS—SHEET 1.

Witnesses:

Inventor.
Albert E. Baum, by
G. C. Kennedy,
Attorney.

A. E. BAUM.
TRANSMISSION DEVICE.
APPLICATION FILED MAY 15, 1911.
1,011,905.
Patented Dec. 19, 1911.
2 SHEETS—SHEET 2.
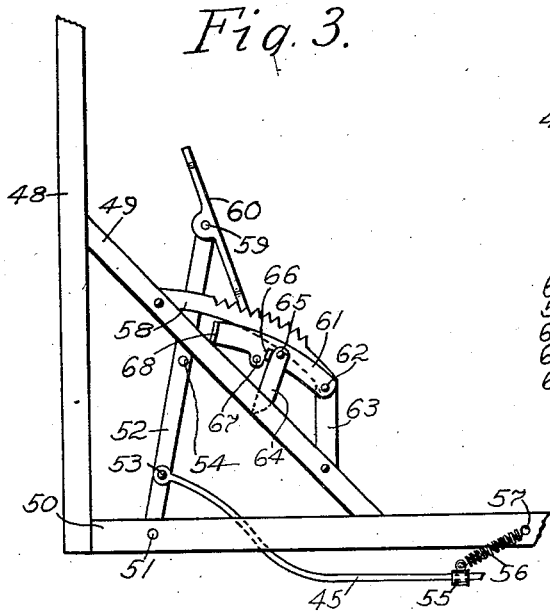
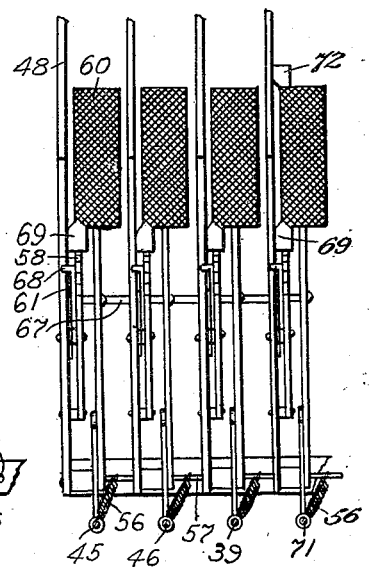
Witnesses:
C. B. Kennedy.
L. F. Nor
Inventor.
Albert E. Baum, by
G. C. Kennedy.
Attorney.

UNITED STATES PATENT OFFICE.

ALBERT E. BAUM, OF WATERLOO, IOWA, ASSIGNOR OF ONE-HALF TO THOMAS GRAHAM, OF WATERLOO, IOWA.

TRANSMISSION DEVICE.

1,011,905. Specification of Letters Patent. Patented Dec. 19, 1911.

Application filed May 15, 1911. Serial No. 627,204.

*To all whom it may concern:*

Be it known that I, ALBERT E. BAUM, a citizen of the United States of America, and a resident of Waterloo, Blackhawk county, Iowa, have invented certain new and useful Improvements in Transmission Devices, of which the following is a specification.

Figure 1:
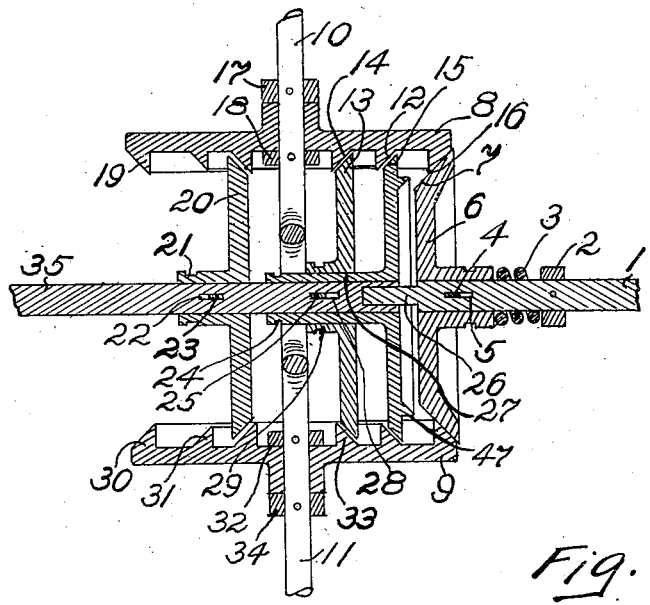
Figure 2:
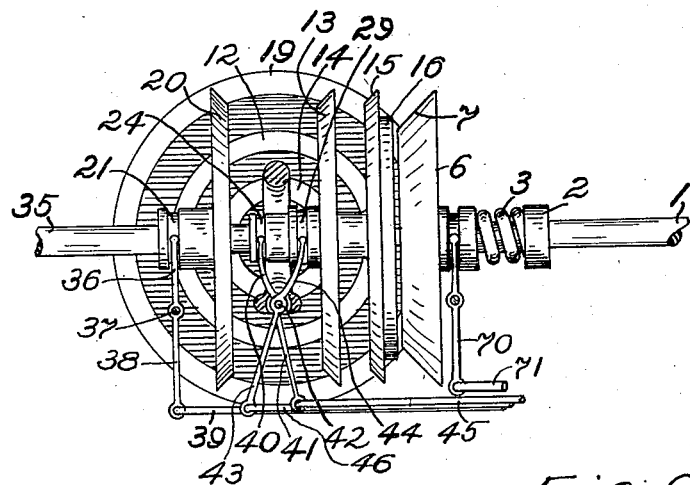

My invention relates to improvements in transmission devices for power, and my object is to provide a highly efficient mechanism of the type, which is both compact and simple, and easy to operate or repair. This object I have accomplished by the following described mechanism, which is illustrated in the accompanying drawings:

Figure 1 is a central horizontal section of my said device, Fig. 2 is a side elevation of the same, with, however, one side friction-idler removed and other parts broken away. Fig. 3 is a side elevation of the means used for shifting the movable parts, and Fig. 4 is a rear elevation of the same.

Similar numerals designate corresponding parts throughout the several views.

My transmission device, while primarily intended for use in connection with the driving of motor vehicles, may be employed with other machinery where its use would be appropriate or convenient.

The numeral 1 designates a driving-shaft and 35 a driven-shaft, both being alined, the shaft 1 having a diminished end portion 26 movably seated in a seat in the adjacent end of the shaft 35, to keep the shafts in alinement. Upon the end of the shaft 1 a friction-wheel 6 is secured slidably but non-rotatably by means of a pin 4 extending through the hub of the wheel and through a relatively long transverse slot 5 in said shaft. Spaced away from said hub, a collar 2 is affixed to the same shaft, with a coiled compression-spring 3 seated about the shaft between them and operatively engaging both. Upon the adjacent end of the shaft 35 the long leftwardly extending hub 27 of a friction-wheel 15 is seated slidably but non-rotatably, being attached by means of a transverse pin 25 seated slidably in a slot 28 in said shaft. A concentric friction-wheel 13 has its hub slidably but non-rotatably seated upon the hub 27, being attached to both said hub and said shaft by the said pin 25. The hub of the wheel 13 has an annular groove 29, while the hub 27 has an annular groove 24, said grooves respectively receiving and being movably engaged by the prongs of the shifting arms 44 and 40, the latter being parts of the rock-arms 43 and 41 respectively, both pivoted medially at 42. Located more to the left on said shaft 35 is another friction-wheel 20, whose hub is annularly grooved at 21 to receive the prongs of the arm 36 of the shifting arm 38, medially pivoted at 37. The hub of said wheel 20 is slidably but non-rotatably mounted on the shaft 35, by means of the pin 23 extending from the hub slidably into the transverse slot 22 in said shaft. Set at right angles to the aforesaid shafts is a fixed shaft composed of alined parts 10 and 11 connected by a medial loop adapted to permit passage therethrough of the shaft 35. Like friction-idlers 8 and 9 are rotatably mounted on these shaft parts respectively, in parallel relation to each other and located just beyond the outer edges of the friction-wheels 15, 13 and 20. Extending inwardly from the idler 8 are the concentric annuli 12, 14 and 19, and extending inwardly from the idler 9 are like annuli 31, 29 and 30, all of said annuli having their outer circumferential edges beveled as shown. The said idlers 8 and 9 are retained on the said shaft parts by means of fixed collars 17 and 18, and 32 and 34 respectively. The circumferential edge of the friction-wheel 6 on the driving-shaft 1 is beveled toward the left to engage the beveled edge of the outer annulus 19 and the edge of the annulus 30, on the idlers 8 and 9 respectively. The beveled face of the edge of the wheel 6 shown at 16 is wider than the bevel of the said annuli and extends farther toward the left for a purpose to be described. The outer edges of the friction-wheels 15, 14 and 20 are beveled and located adjacent to the similarly beveled faces of the annuli 12 and 14, and 31 and 33. The outer ends of the shifting-arms 41, 43, 38 and 70 are pivotally connected with shifting-rods 45, 46, 39 and 71 respectively, and said rods are shifted by the following means.

The numerals 48 and 49 designate supporting uprights and their braces respectively, the latter supporting the fixed uprights 63 and the segment-racks 58. Levers 52 have their lower ends pivoted on a rod 51, and studs 53 on their sides permit of the pivoting at that location the forward ends of the shifting-rods 45, 46, 39 and 71. A coiled spring 56 secured between a fixed rod 57 and a collar 55 fixed on each shifting-rod, keeps the shifting-rod retracted rearwardly. The upper end of each lever 52 has a pedal 60 pivoted to it on pintles 59. A pawl-shaped projection 69 extends downward from each pedal 60 and is adapted to removably engage the teeth on the rack-segment 58 adjacent thereto.

The numeral 61 designates a releasing-arm pivoted on each upright 63 on a stud 62 and extends forwardly, having a curve of the same radius as the curve of the rack-segment 58 adjacent thereto. All the releasing-arms are connected by a rod 67 which constrains them to act simultaneously when moved. The flange 68 on the forward end of each arm prevents the arm from dropping down unduly.

The numeral 64 designates a swinging-arm pivoted and depending from a stud 65 on the arm 61. The play of the arm 64 is limited forwardly by means of a stop-projection 66 on the arm 61, but the arm 64 is free to swing rearwardly when engaged and pushed backwardly by the stud 54 on the lever 52.

When the operator desires to shift one of the shifting-rods, 45, 46 or 39 from its rearward position as retracted by the spring 56, he places his foot on the proper pedal 60 and moves the latter forward. Said lever brings its stud 54 into engagement with the depending arm 64, pushing the latter forward and upward, with the releasing-arm 61. The result is to simultaneously lift all the releasing arms 61 whose upper edges then engage the projections 69 of all the pedals and lift the latter free from the rack-segments, the particular pedal being operated then being held and the projection 69 thereof dropped into the teeth of the adjacent rack-segment after moving the lever a little farther along the rack. In the same way, to use another pedal to shift another or different shifting-rod, the action is the same, in each case but one shifting-rod is used at a time, the others being held in inoperative positions.

By the above described mechanism, the shaft 35 is acted upon as follows. To attain a slow speed the friction-wheel 13 is shifted into engagement with the annuli 14 and 33 on the idlers 8 and 9 respectively, it being understood that the wheels 15 and 20 are running idle, while the wheel 6 engages both said idlers. For an intermediate speed, the wheel 13 is disengaged, and the wheel 15 engaged with the annuli 12 and 31 on said idlers respectively. To attain high speed, the wheel 15 is disengaged and shifted sufficiently to the right by first releasing the lower detent 69 on the appropriate pedal 60, then rocking the pedal over so as to bring the upper detent 72 thereof downwardly, carrying the pedal to the rearward limit, and engaging said detent 72 with the adjacent rack-segment, whereby the connections are operated, so that the annulus 47 on said wheel may engage that part 16 of the beveled edge of the wheel 6 which extends to the left, and push said wheel 6 to the right and out of engagement with said idlers, when the driving-shaft 1 will by reason of the frictional engagement of the wheels 6 and 15, drive the shaft 35 directly at full speed. When the wheel 15 is shifted again to the left but not into engagement with said idlers, the wheel 6 will reëngage said idlers, the latter however, running idle, and not driving the shaft 35. To reverse the direction of rotation of the driven-shaft 35, when in the last-described position of the moving parts, it is merely necessary to shift the friction-wheel 20 into engagement with the annuli 14 and 33, on the said idlers 8 and 9 respectively, at low speed. It will be perceived that the parts move easily and positively into engagement.

Having described my invention, what I claim as new, and desire to secure by Letters Patent, is:

1. In combination in a transmission device, a plurality of independently shiftable friction disks, idler friction disks located oppositely about said shiftable disks and having on their inwardly-directed faces friction-rings placed concentric with their axes, a shifting-rod operatively connected to each of said shiftable disks, means for selectively actuating said rods to shift either of said shiftable disks into operative engagement with certain of the concentric rings on said idler disks, a driving-shaft, a driven shaft, means for communicating rotation from said driving shaft to said idler disks, said shiftable disks being slidably but non-rotatably mounted on said driven shaft, and yieldable resilient means connected to each shifting-rod and adapted to draw it in a direction to shift its connected shiftable disk out of engagement with said idler-disks.

2. In combination in a transmission device, a plurality of independently shiftable friction-disks, idler friction-disks each having on its face directed toward said shiftable disks a plurality of friction rings concentric with its axis, a shifting-rod operatively connected to each of said shiftable disks, means for selectively actuating said rods to shift either of said shiftable disks into operative engagement with certain of the friction-rings on said idler-disks, a driving-shaft, a driven-shaft alined therewith, a friction-disk slidably but non-rotatably mounted on said driving-shaft and movable into or out of operative engagement with said idlers, and means for exercising a yieldable resilient tension upon the latter shiftable disk to normally keep it in driving contact with said idlers, the first-mentioned shiftable disks being slidably but non-rotatably mounted on said driven shaft.

3. In combination in a transmission device, a plurality of independently shiftable friction disks, idler friction disks, a shifting-rod operatively connected to each of said shiftable disks, means for selectively actuating said rods to shift either of said shiftable disks into operative contact with said idler disks comprising pivoted levers each having a pivotal connection with the adjacent end of a certain one of said shifting-rods, means for removably securing each lever in a desired position, and means for disengaging all but one of the levers from said securing means when that lever is secured by said means, a driving shaft, means adapted to be engaged operatively between said idler disks and said driving shaft to rotate said disks, and a driven-shaft, said first-mentioned shiftable disks being slidably but non-rotatably mounted on said driven shaft.

4. In combination in a transmission device, a plurality of independently shiftable friction disks, idler friction disks, a shifting-rod operatively connected to each of said shiftable disks, yieldable resilient means connected to each shifting-rod and adapted to draw it in a direction suitable to shift its connected shiftable disk out of engagement with said idler-disks, means for selectively actuating said rods to shift either of said shiftable disks into operative contact with said idler disks comprising pivoted levers each having a pivotal connection with the adjacent end of a certain one of said shifting-rods, means for removably securing each lever in a desired position, and means for disengaging all but one of the levers from said securing means when that lever is secured by said means, a driving shaft, means adapted to be engaged operatively between said idler disks and said driving shaft to rotate said disks, and a driven-shaft, said first-mentioned disks being slidably but non-rotatably mounted on said driven shaft.

5. In combination, in a transmission device, a plurality of independently shiftable friction-disks, idler friction-disks each having on its face which is directed toward said shiftable disks a plurality of concentric outwardly beveled friction-rings, shifting-rods connected independently to said shiftable disks, means for selectively actuating said rods to shift either of said shiftable disks into and out of operative engagement with certain adjacent friction rings on said idler disks, a driving-shaft, a driven-shaft alined therewith, a friction-disk slidably but non-rotatably mounted on said driving-shaft, a shifting-rod connected to said last-mentioned friction-disk and adapted to shift it out of engagement with said idler-disks, resilient means engaging said friction-disk and adapted to keep it in operative engagement with said idlers, the said idlers having outwardly beveled edges, and the said friction-disk having a beveled edge adapted to engage the beveled edges of said idlers frictionally and project inwardly therefrom, the adjacent one of the first-mentioned shiftable disks having on its face turned toward the last-mentioned disk a concentric ring beveled inwardly and formed to fit over the inwardly projecting border of the beveled edge of the latter, and means for shifting the former disk toward the latter disk to frictionally engage said coöperating beveled parts to push the latter disk out of engagement with said idler-disks and permit the driving-shaft to directly drive said driven-shaft through the medium of said coöperating parts.

Signed at Waterloo, Iowa, this 29th day of April, 1911.

ALBERT E. BAUM.

Witnesses:
W. H. BRUNN,
G. C. KENNEDY.

---

Copies of this patent may be obtained for five cents each, by addressing the "Commissioner of Patents, Washington, D. C."